(12) United States Patent
Chen et al.

(10) Patent No.: US 10,894,916 B2
(45) Date of Patent: Jan. 19, 2021

(54) CURABLE RESIN SYSTEM CONTAINING QUANTUM DOTS

(71) Applicants: Dow Global Technologies LLC, Midland, MI (US); Rohm and Haas Electronic Materials LLC, Marlborough, MA (US)

(72) Inventors: Liang Chen, Midland, MI (US); Jake Joo, Somerville, MA (US); Yuming Lai, Midland, MI (US); Zhifeng Bai, Midland, MI (US); Jessica Ye Huang, Sugarland, TX (US); James C. Taylor, Grafton, MA (US)

(73) Assignees: Rohm and Haas Electronic Materials LLC, Marlborough, MA (US); Dow Global Technologies LLC, Midland, MI (US)

( * ) Notice: Subject to any disclaimer, the term of this patent is extended or adjusted under 35 U.S.C. 154(b) by 87 days.

(21) Appl. No.: 16/078,778

(22) PCT Filed: Mar. 31, 2017

(86) PCT No.: PCT/US2017/025267
§ 371 (c)(1),
(2) Date: Aug. 22, 2018

(87) PCT Pub. No.: WO2017/180333
PCT Pub. Date: Oct. 19, 2017

(65) Prior Publication Data
US 2019/0048256 A1 Feb. 14, 2019

Related U.S. Application Data

(60) Provisional application No. 62/321,277, filed on Apr. 12, 2016.

(51) Int. Cl.
| | | |
|---|---|---|
| *C09K 11/02* | (2006.01) | |
| *C09K 11/06* | (2006.01) | |
| *C09K 11/88* | (2006.01) | |
| *C09K 11/77* | (2006.01) | |
| *C09K 11/89* | (2006.01) | |
| *C09D 4/06* | (2006.01) | |
| *C08F 220/20* | (2006.01) | |
| *C09D 133/06* | (2006.01) | |
| *C08L 33/14* | (2006.01) | |
| *C08L 35/02* | (2006.01) | |
| *C08F 222/10* | (2006.01) | |
| *B82Y 20/00* | (2011.01) | |
| *B82Y 40/00* | (2011.01) | |

(52) U.S. Cl.
CPC .......... *C09K 11/025* (2013.01); *C08F 220/20* (2013.01); *C08L 33/14* (2013.01); *C08L 35/02* (2013.01); *C09D 4/06* (2013.01); *C09D 133/066* (2013.01); *C09K 11/02* (2013.01); *C09K 11/06* (2013.01); *C09K 11/7798* (2013.01); *C09K 11/883* (2013.01); *C09K 11/885* (2013.01); *C09K 11/89* (2013.01); *B82Y 20/00* (2013.01); *B82Y 40/00* (2013.01); *C08F 222/1025* (2020.02); *C08L 2205/025* (2013.01); *C08L 2205/03* (2013.01); *C08L 2205/14* (2013.01)

(58) Field of Classification Search
CPC ........ C08K 9/10; C09K 11/025; C09K 11/06; C09K 11/02; C09K 11/04; C09K 11/89; C09K 11/883; C09K 11/7798; C09K 11/885; C08L 33/14; C08L 35/02; C08L 2205/025; C08L 2205/03; C08L 2205/14; B82Y 20/00; B82Y 40/00
See application file for complete search history.

(56) References Cited

U.S. PATENT DOCUMENTS

| | | | |
|---|---|---|---|
| 9,708,532 B2 * | 7/2017 | Vo ............................ | C08K 9/10 |
| 10,069,044 B2 * | 9/2018 | Seo ........................ | H01L 33/502 |
| 2016/0084476 A1 * | 3/2016 | Koole ....................... | B05D 1/18 |
| | | | 252/301.33 |
| 2016/0164031 A1 | 6/2016 | Pieper et al. | |
| 2017/0096600 A1 * | 4/2017 | Tour ........................ | C08K 3/042 |

(Continued)

OTHER PUBLICATIONS

Chang, et al., "Strategies for photoluminescence enhancement of AgInS2 quantum dots and their application as bioimaging probes", Journal of Materials Chemistry, 2012, pp. 10609, vol. 22, No. 21.
Duan, et al, "Quantum dots with multivalent and compact polymer coatings for efficient fluorescence resonance energy transfer and self-assembled biotagging", Chemistry of Materials, 2010, pp. 4372-4378, vol. 22, No. 15.

* cited by examiner

*Primary Examiner* — Sanza L. McClendon
(74) *Attorney, Agent, or Firm* — G. Creston Campbell

(57) ABSTRACT

A polymer composite comprising quantum dots. The polymer composite comprises: (a) quantum dots; (b) a first polymer having a molecular weight from 1,000 to 100,000 and a solubility parameter from 12 to 17 $(J/cm^3)^{1/2}$; (c) a second polymer comprising polymerized units of a first compound comprising at least one readily polymerizable vinyl group and having a molecular weight from 72 to 500, wherein the second polymer has a solubility parameter from 16.5 to 20 $(J/cm^3)^{1/2}$; and (d) a third polymer comprising polymerized units of a second compound comprising at least two readily polymerizable vinyl groups and having a molecular weight from 72 to 2000; wherein the first polymer encapsulates the quantum dots; wherein a readily polymerizable vinyl group is part of a (meth)acrylate ester group or is attached directly to an aromatic ring.

4 Claims, No Drawings

(56) References Cited

U.S. PATENT DOCUMENTS

2017/0158954 A1* 6/2017 Yang ..................... G03F 7/0007
2018/0079868 A1* 3/2018 Yamada ................. C09K 19/00
2018/0273843 A1* 9/2018 Pan ..................... C09K 11/883

CURABLE RESIN SYSTEM CONTAINING QUANTUM DOTS

FIELD OF THE INVENTION

The present invention relates to a curable resin system containing quantum dots.

BACKGROUND OF THE INVENTION

Semiconductor quantum dots (QD) provide optical absorption and emission (photoluminescence PL or electroluminescence EL) behaviors that are significantly different from those of bulk materials. As the particle size decreases, effective energy bandgap (Eg), or available energy levels, increases and creates a blue shifted PL spectrum. This spectrum tunability by the particle size dependent quantum confinement effect within the same material is a critical advantage over conventional bulk semiconductors. Because of their unique optical properties, QD have been of great interest in many display and lighting applications. Most QD have inorganic shells with a larger bandgap material to confine electron and hole pairs within the core region and prevent any surface charge states. The outer shells are then capped by organic ligands to reduce trap states of the shell that can lead to reduced quantum yield (QY). Organic ligands help QD to disperse in organic/aqueous solvents. Typical organic ligands surrounding QD have relatively long alkyl chains which provide high solubility in non-polar solvents or monomers. Unfortunately, QD are very susceptible to photo-oxidation during light absorption/conversion process. Also, moisture can have a similar impact when ligands are not compatible with solvents or monomers. QD typically are encapsulated in a polymer matrix to protect them from adverse effects of water and oxygen. For example, US2015/0072092 discloses siloxane compounds partially modified by (meth)acryloyloxy groups and/or epoxy groups for forming a film containing quantum dots. However, this reference does not disclose the compositions described herein.

SUMMARY OF THE INVENTION

The present invention provides a polymer composite comprising quantum dots; said polymer composite comprising: (a) quantum dots; (b) a first polymer having a molecular weight from 1,000 to 100,000 g/mol and a solubility parameter from 12 to 17 $(J/cm^3)^{1/2}$; (c) a second polymer comprising polymerized units of a first compound comprising at least one readily polymerizable vinyl group and having a molecular weight from 72 to 500, wherein the second polymer has a solubility parameter from 16.5 to 20 $(J/cm^3)^{1/2}$; and (d) a third polymer comprising polymerized units of a second compound comprising at least two readily polymerizable vinyl groups and having a molecular weight from 72 to 2000; wherein the first polymer encapsulates the quantum dots; wherein a readily polymerizable vinyl group is part of a (meth)acrylate ester group or is attached directly to an aromatic ring.

The present invention further provides a method for producing the polymer composite. The method comprises steps of: (a) precipitating encapsulated quantum dots from a mixture comprising quantum dots, a first polymer having a molecular weight from 1,000 to 100,000 g/mol and a solubility parameter from 12 to 17 $(J/cm^3)^{1/2}$ and a solvent; (b) spray drying the solution and encapsulated quantum dots from step (a) together with a second polymer comprising polymerized units of a first compound comprising at least one readily polymerizable vinyl group and having a molecular weight from 72 to 500 and a solubility parameter from 16.5 to 20 $(J/cm^3)^{1/2}$ to produce an encapsulated quantum dot powder; and (c) dispersing the encapsulated quantum dot powder in a second compound comprising at least two readily polymerizable vinyl groups and having a molecular weight from 72 to 2000 and curing to form a polymer composite; wherein a readily polymerizable vinyl group is part of a (meth)acrylate ester group or is attached directly to an aromatic ring.

DETAILED DESCRIPTION OF THE INVENTION

Percentages are weight percentages (wt %) and temperatures are in ° C., unless specified otherwise. Operations were performed at room temperature (20-25° C.), unless specified otherwise. Boiling points are measured at atmospheric pressure (ca. 101 kPa). The term "(meth)acrylate" means acrylate or methacrylate. Quantum dots are well known in the art, see, e.g., US2012/0113672. Molecular weight is measured in Daltons and is the sum of the atomic weights for a monomeric compound and the weight-average molecular weight (Mw) for mixtures, e.g., oligomeric or polymeric compounds.

Solubility parameters are calculated according to the technique described in Fedors, *Polym. Eng. and Sci.,* 14 (1974), 147. For a mixture of monomers or polymers, the solubility parameter is defined as the weighted average (by weight) of the solubility parameters of the different monomeric or polymeric constituents, respectively. Values of the solubility parameter for polymeric materials are widely available, e.g, in Polymer Handbook, 2nd Edition, Brandrup J. and E H Immergut, ed., Wiley-Interscience, John Wiley & Sons, N.Y. (1975).

Preferably, the first polymer has an acid value from 0.1 to 500 mg KOH/g; preferably at least 0.5, preferably at least 1; preferably no greater than 400, preferably no greater than 350. Preferably, the first polymer has a molecular weight of at least 1,000 g/mol, preferably at least 1,500, preferably at least 2,000, preferably at least 2,500; preferably no more than 100,000, preferably no more than 80,000, preferably no more than 60,000. Preferably, the first polymer has a solubility parameter of at least 14 $(J/cm^3)^{1/2}$; preferably at least 15; preferably no greater than 16.5, preferably no greater than 16. Preferably the solubility parameter of the second polymer minus the solubility parameter of the first polymer is at least 0.5 $(J/cm^3)^{1/2}$; preferably at least 0.75, preferably at least 1.

Preferably, the first compound has a molecular weight of at least 100, preferably at least 120, preferably at least 140; preferably no more than 400, preferably no more than 350. Preferably, the second compound has a molecular weight of at least 150, preferably at least 200; preferably no more than 700, preferably no more than 600, preferably no more than 550. The second polymer may comprise polymerized units of monomers other than the first compound, but preferably the second polymer comprises at least 60% polymerized units of the first compound, preferably at least 70%, preferably at least 80%. Preferably, the second polymer has a solubility parameter of at least 17 $(J/cm^3)^{1/2}$; preferably no greater than 19.5, preferably no greater than 19. In a preferred embodiment, the second polymer is a copolymer; preferred copolymers include, e.g., methyl methacrylate-ethyl acrylate copolymer and ethylene-norbornene copolymer. Preferably, the second polymer has a glass transition temperature ($T_g$) of at least 60° C.

The third polymer may comprise polymerized units of monomers other than the second compound, but preferably the third polymer comprises at least 60% polymerized units of the second compound, preferably at least 70%, preferably at least 80%. When a polymerizable vinyl group is attached to an aromatic ring (e.g., a benzene, naphthalene or pyridine ring), preferably the aromatic ring has from three to twenty carbon atoms, preferably from five to fifteen. Preferably, the aromatic ring contains no heteroatoms and has from six to fifteen carbon atoms, preferably from six to twelve carbon atoms.

Preferably, the third polymer has a solubility parameter from 20 to 28 $(J/cm^3)^{1/2}$; preferably at least 20.5, preferably at least 21; preferably no greater than 26, preferably no greater than 24. Preferably the solubility parameter of the third polymer minus the solubility parameter of the second polymer is at least 0.5 $(J/cm^3)^{1/2}$; preferably at least 1, preferably at least 1.5.

Preferably, the first compound has one or two readily polymerizable vinyl groups, preferably one. When the first compound is an oligomer the number of vinyl groups is the number average for the distribution. Preferably, the second compound has from two to six readily polymerizable vinyl groups, preferably no more than four, preferably no more than three; preferably two. Preferably, the polymerizable vinyl groups in the first compound are (meth)acrylate ester groups ($CH_2$=C(R)C(O)O—, where R is H or $CH_3$; also known as (meth)acryloyloxy). Preferably, the second compound has (meth)acrylate ester groups or the second compound is divinylbenzene. Preferably, the second compound is a cyclic compound, i.e. one having at least one aliphatic or aromatic ring. Preferably, the first compound has no atoms other than carbon, hydrogen, oxygen and nitrogen atoms; preferably no atoms other than carbon, hydrogen and oxygen (this does not exclude trace levels from impurities). Preferably, the second compound has no atoms other than carbon, hydrogen, oxygen and nitrogen atoms; preferably no atoms other than carbon, hydrogen and oxygen. Preferably, the first compound is aliphatic. The third polymer may comprise polymerized units of monomers other than the second compound. Preferably, the third polymer comprises at least 25 wt % polymerized units of the second compound, preferably at least 30 wt %, preferably at least 40 wt %, preferably at least 50 wt %. In a preferred embodiment, the third polymer comprises no more than 70 wt % polymerized units of the second compound, preferably no more than 60 wt %. The third polymer may comprise polymerized units of a monomer other than the second compound; said monomer having from one to four readily polymerizable vinyl groups, preferably from one to three, preferably one or two, preferably one. Preferred additional monomers include, e.g., 2-hydroxyethyl acrylate (HEA), 2-hydroxyethyl methacrylate (HEMA), hydroxypropyl acrylate (HPA), hydroxypropyl methacrylate (HPMA) or carboxylic acid (meth)acrylates such as 2-carboxy ethyl (meth)acrylate oligomer (CEAO or CEMAO), acrylic acid (AA), or methacrylic acid (MAA).

Preferably, the quantum dots are precipitated from a solution comprising quantum dots, first polymer and solvent by cooling or by adding a solvent in which the first polymer has poor solubility.

Preferably, the spray drying is performed at an outlet temperature <100° C.; preferably <80° C., preferably <60° C.; Preferably, the spray dryer is equipped with a two fluid or ultrasonic nozzle atomizer.

Preferably, the polymer composite comprises from 0.01 to 4 wt % quantum dots; preferably at least 0.03 wt %, preferably at least 0.05 wt %; preferably no more than 3 wt %, preferably no more than 2 wt %. Preferably, the polymer composite comprises from 1 to 30 wt % of the first polymer; preferably at least 1.5 wt %, preferably at least 2 wt %; preferably no more than 25 wt %, preferably no more than 20 wt %. Preferably, the polymer composite comprises from 1 to 30 wt % polymerized units of the second polymer; preferably at least 1.5 wt %, preferably at least 2 wt %; preferably no more than 30 wt %, preferably no more than 20 wt %. Preferably, the polymer composite comprises from 60 to 98 wt % polymerized units of the third polymer; preferably at least 65 wt %, preferably at least 70 wt %; preferably no more than 96 wt %, preferably no more than 94 wt %.

Especially preferred first polymers are copolymers containing acid or maleic anhydride groups, including maleic anhydride (MA)-olefin copolymers, acrylic-olefin copolymers, styrene-MA copolymers and oxidized polyethylene.

Especially preferred second polymers have a $T_g$ or melting temperature of at least 60° C. and are soluble in the solvent used in the first step. For example, include polystyrene derivatives, poly(meth-)acrylate esters, ethylene-norbornene copolymers.

Especially preferred third polymers containing two types of monomers.

Preferred first compounds include isobornyl (meth)acrylate, $C_2$-$C_{18}$ alkyl (meth)acrylates (e.g., isobutyl (meth)acrylate, 3,5,5-trimethylhexyl acrylate, dodecyl acrylate, decyl acrylate, tridecyl acrylate and isodecyl acrylate), L-menthyl acrylate, tricyclo[5.2.1.0$^{2,6}$]decylmethyl acrylate, $C_1$-$C_6$ alkylstyrenes, 3,3,5-trimethylcyclohexyl methacrylate and 3,3,5-trimethylcyclohexyl methacrylate.

Preferred second compounds include tricyclo [5.2.1.0$^{2,6}$] decane dimethanol di(meth)acrylate, Bisphenol A di(meth)acrylate, Bisphenol A glycerolate di(meth)acrylate, 2-butyl-2-ethyl-1,3-propanediol dimethacrylate, 1,10-bis(acryloyloxy)decane and

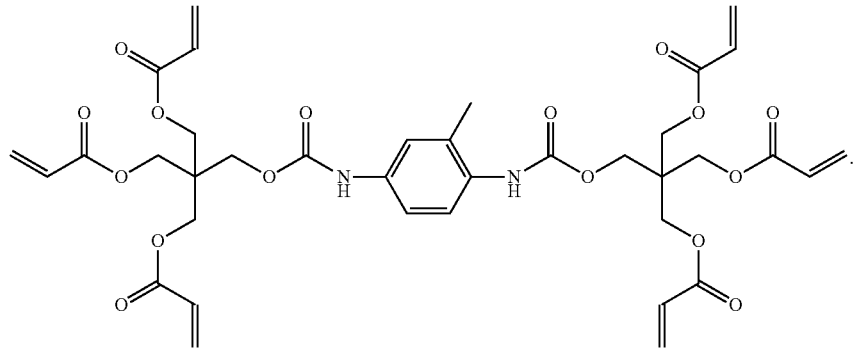

(A)

and urethane acrylate oligomers can be polyester type, polyether type, polybutadiene type, or polycarprolactone type. They can have difunctional, trifunctional, hexafunctional reactivities. Viscosities of oligomers can range from 1000 to 200,000 cPs at 50° C. For QDs with non-polar ligand, polybutadiene types are preferred.

Preferably, there are three distinct phases in the composite (QD/polypolymer1, polypolymer 2, and polypolymer 3). For example, the average particle size of the first polymer phase is 0.1-5 micron; the first polymer phase is preferably surrounded by the second polymer, and the average particle size of the first and second phases is 1-10 micron.

In one preferred embodiment of the invention, polymer composite comprises: (a) quantum dots; (b) a first polymer comprising polymerized units of a first compound comprising at least one readily polymerizable vinyl group and having a molecular weight from 72 to 500, wherein the first polymer has a solubility parameter from 16.5 to 20 $(J/cm^3)^{1/2}$; and (c) a second polymer comprising polymerized units of a second compound comprising at least two readily polymerizable vinyl groups and having a molecular weight from 72 to 2000; wherein the first polymer encapsulates the quantum dots; wherein a readily polymerizable vinyl group is part of a (meth)acrylate ester group or is attached directly to an aromatic ring.

The present invention further provides a polymer composite comprising quantum dots; said polymer composite comprising: (a) quantum dots; (b) a first polymer having a molecular weight from 1,000 to 100,000 and a solubility parameter from 12 to 17 $(J/cm^3)^{1/2}$; and (c) a second polymer comprising polymerized units of a first compound comprising at least one readily polymerizable vinyl group and having a molecular weight from 72 to 500, wherein the second polymer has a solubility parameter from 16.5 to 20 $(J/cm^3)^{1/2}$.

In one preferred embodiment of the invention, the polymer composite is part of a multilayer assembly which also comprises an outer layer on each side of the polymer composite. Preferably, the outer layer is an oxygen barrier which also inhibits passage of moisture. Preferably, the outer layer comprises a polymer composite, preferably one comprising polyethylene terephthalate (PET), polyaryletherketones, polyimides, polyolefins, polycarbonate, polymethyl methacrylate (PMMA), polystyrene, or a combination thereof. Preferably, the outer layer further comprises oxides or nitrides, preferably silicon oxides, titanium dioxide, aluminum oxide, silicon nitrides or a combination thereof. Preferably the oxides or nitrides are coated on the surface of the polymer composite facing the QD layer Preferably, each outer layer comprises a polymer composite having a thickness from 25 to 150 microns (preferably 50 to 100 microns) and an oxide/nitride layer having a thickness from 10 to 100 nm (preferably 30 to 70 nm). In some preferred embodiments of the invention, the outer layer comprises at least two polymer composite layers and/or at least two oxide/nitride layers; different layers may be of differing composition. Preferably, the outer layers have a very low oxygen transmission rate (OTR, $<10^{-1}$ cc/m$^2$/day) and low water vapor transmission rate (WVTR, $<10^{-2}$ g/m$^2$/day) Preferably, the polymer composite in the outer layers has a $T_g$ from 60 to 200° C.; preferably at least 90° C., preferably at least 100° C.

Preferably, the thickness of the polymer composite of this invention is from 20 to 500 microns, preferably at least 50 microns, preferably at least 70 microns, preferably at least 80 microns, preferably at least 90 microns; preferably no greater than 400 microns, preferably no greater than 300 microns, preferably no greater than 250 microns, preferably no greater than 200 microns, preferably no greater than 160 microns.

Preferably, the polymer composite of this invention is prepared by free radical polymerization of the resin prepared by mixing monomers, QD and other optional additives. Preferably, the resin is coated on a first outer layer prior to curing by typical methods, e.g., spin coating, slot die coating, gravure, ink jet and spray coating. Preferably, curing is initiated by exposing the resin to ultraviolet light or heat, preferably ultraviolet light, preferably in the UVA range.

Preferably, the polymer composite of this invention comprises from 0.01 to 4 wt % of quantum dots, preferably at least 0.03 wt %, preferably at least 0.05 wt %; preferably no more than 4 wt %, preferably no more than 3 wt %, preferably no more than 2 wt %. Preferably, quantum dots comprise CdS, CdSe, CdTe, ZnS, ZnSe, ZnTe, HgS, HgSe, HgTe, GaN, GaP, GaAs, InP, InAs or a combination thereof. In a preferred embodiment, the quantum dots are cadmium-free.

Preferably, ligands surrounding the inorganic part of quantum dots have non-polar components. Preferred ligands include, for example, trioctyl phosphine oxide, dodecanethiol and fatty acid salts (e.g., stearate salts, oleic acid salts).

Other additives which may be incorporated into the polymer composite of this invention include UV stabilizers, antioxidants, scattering agents to improve light extraction, and non-reactive thickeners to increase viscosity. Preferred thickeners include cellulose ethers, cellulose acrylic esters, polystyrene polymers, polystyrene block copolymers, acrylic resin and polyolefin elastomers. Preferably, polystyrene, acrylic and polyolefin thickeners have Mw from 50,000 to 400,000; preferably from 100,000 to 200,000. Preferably, cellulose ethers have Mw from 1,000 to 100,000.

Preferably, the first inner layer comprises from 1 to 60 wt % urethane acrylates, preferably at least 5 wt %, preferably at least 10 wt %; preferably no more than 50 wt %, preferably no more than 40 wt %.

Preferred forms for the polymer composite include, e.g., composites, beads, strips, rods, cubes and plates. The polymer composite is useful in many applications, including, e.g., displays, lighting and medical applications. Preferred display applications include public information displays, signage, televisions, monitors, mobile phones, tablets, laptops, automotive dashboards and watches.

EXAMPLES

Abbreviations Used in Examples:

PiBOMA is polyisobornyl methacrylate (Mw=100 kg/mol, $T_g$=110° C.) from Scientific Polymer Products
PiBMA is polyisobutyl methacrylate (Mw=130 kg/mol, $T_g$=65° C.) from Aldrich
COC 5013 is ethylene-norbornene copolymer (Mw=80.5 kg/mol, $T_g$=140° C.) from TOPAS
Poly(maleic anhydride-alt-1-octadecene) (Mw=30-50 kg/mol, acid value=310-315 mg KOH/g) from Aldrich
SMA EF-60 is styrene-maleic anhydride copolymer (Mw=11.5 kg/mol, acid value=156 KOH/g) from Cray Valley
LICOCENE 4221 is maleic anhydride grafted PE (Mw=4 kg/mol, acid value=17 mg KOH/g) from Clariant
HEA is 2-hydroxyethyl acrylate from Aldrich
CN104 is bisphenol A epoxy diacrylate from Sartomer
SR833 is tricyclo $[5.2.1.0^{2,6}]$ decane dimethanol diacrylate from Sartomer
I-819 is an IRGACURE photoactive polymerization initiator from Ciba-Geigy Corp.
FINEX 30S LP2 is ultrafine Zinc Oxide from Sakai Chemical Industry Co.

Part I:
Preparation of Encapsulated QDs
Step 1. Co-Precipitation

Polymer 1 was dissolved into a QD-compatible solvent (e.g. toluene) by heating the solution to 100° C. QD stock solution was added into the polymer solution at 100° C. The polymer/QDs then quickly precipitated to form micron size particles by either quickly cooling down the solution or by introducing another QD-compatible solvent (non-solvent for polymer 1) into the QD/polymer solution. As a result, this process yields particles of encapsulated QDs/polymer suspended in solvent, and QDs are uniformly dispersed in the polymer matrix. Next, polymer 2 was preferably introduced into the solution prior to the spray drying process.

Step 2. Spray Drying

A typical spray drying condition is described below unless specified. A fountain two-fluid nozzle atomizer was equipped on a Mobile Minor spray dryer (GEA Process Engineering Inc.). The above solution was fed into spray dryer using a peristaltic pump (Masterflex L/S). Inlet temp 80° C. and outlet temp 55° C. Liquid feed rate=10 mL/min (setting) and $N_2$ flow rate to nozzle atomizer=1 bar 60% flow. The spray drying process produces a free-flowing QD polymer powder with well-controlled particle size (~5 micron), where polymer 2 surrounds the particles of encapsulated QDs in polymer 1

Preparation of QD Resin Films

The film formulation was prepared in a oxygen-free environment (e.g. in a glovebox)
1. Monomers were degassed under vacuum for 1 hour
2. A solution of 50 wt % FINEX 30S LP2 in above monomers was prepared by using a speed mixer (FlackTek Inc, Landrum, S.C.))
3. A solution of 1.75 wt % I-819 in above monomers was prepared by stirring the mixture at RT
4. Into the QD sample the I-819/monomers was introduced
6. FINEX 30S LP2/monomers solution was mixed into above solution by using speed mixer
7. QDs film of ~100 μm was prepared by curing the monomers under UV (UVA, ~400 mJ/cm²) sandwiched by two i-components barrier films for QY testing PLQY Measurement PLQY was measured using an absolute PL quantum yield spectrometer (Quantaurus (C11347-01), Hamamatsu, Japan). Integrating sphere allows ~99% reflection from 350~1600 nm. Both incident and emitted photons have to undergo multiple reflections in order to reach detector (this helps eliminate optical anisotropy in the quantum yield measurement). Excitation wavelength is set at 450 nm and wavelength for PL is between 460 and 950 nm. Solution samples are placed at the center (transmission) of the integration sphere; film samples are placed at the bottom. Direct measurement of absolute PLQY is the ratio of # of photons emitted to # of photons absorbed Part II. OD Compatibility with Polymers Solution PLQY was used to assess the compatibility between QDs (Lot #: 15-004) and polymer 1

TABLE 2

Solution PLQY measurement 1

| | PLQY | Absorption | Peak Wavelength (nm) | Peak FWHM (nm) |
|---|---|---|---|---|
| 1 | 0.716 | 0.572 | 537.36 | 43.34 |
| 2 | 0.67 | 0.46 | 537.36 | 44.21 |
| 3 | 0.693 | 0.521 | 535.86 | 43.24 |
| 4 | 0.662 | 0.609 | 541.1 | 42.61 |

* take 1.0 g of each solution (0.37 mg QD/mL) to a 1 mL glass vial and measure PL QY, PWL, FWHM @ 450 nm excitation using Hamamatsu absolute PL QY equipment 1: QD in toluene without polymer was heated to 100° C. for 5 min
2: Poly(maleic anhydride-alt-1-octadecene) was mixed with QD in toluene at ambient temperature
3: SMA EF-60 was mixed with QD in toluene at ambient temperature
4: LICOCENE 4221 and QDs in toluene was heated at 100° C. for 5 min for dissolving the polymer and subsequently cool down the mixture to ambient temperature Based on the PLQY data, above exemplified polymer 1 containing acid functionality are compatible with CF-QDs
Solution PLQY was used to determine the compatibility between QDs (Lot #: 15-004) and polymer 2

TABLE 2

Solution PLQY measurement 2

| | Solvent | QY (%) | Absorbance | Emission peak (nm) | FWHM (nm) |
|---|---|---|---|---|---|
| 5 | Toluene | 72.4 | 0.106 | 535.4 | 43.1 |
| 6 | 10 wt % PiBMA in toluene | 70.7 | 0.073 | 532.2 | 44.5 |
| 8 | 10 wt % PiBOMA in toluene | 68.5 | 0.089 | 535.4 | 43.0 |
| 9 | 10 wt % ethylene-norbornene copolymer in toluene | 72.5 | 0.085 | 534.2 | 44.0 |

* take 0.2 g of each solution (0.77 mg QD/mL) to a 1 mL vial and measure PL QY, PWL, FWHM at 450 nm excitation using Hamamatsu absolute PL QY equipment Based on the PLQY data, the polymer compatible with CF-QDs are preferably used as a second polymer phase to form a composite QD powder Part III: Encapsulated QDs and Films

| | |
|---|---|
| Encapsulated QD 1 | PiBOMA/Licocene4221 (1:1) + green QDs (5 wt % loading in Licocene phase) by co-precipitation and spray drying |
| Encapsulated QD 2 | PiBOMA/Licocene4221 (1:2) + red QDs (4.5 wt % loading in Licocene phase) by co-precipitation and spray drying |
| QD solution 1 | 8.53 wt % green QDs (15-004) in toluene |
| QD solution 2 | 8.90 wt % green QDs (15-004) in isobornyl acrylate (IBOA) |
| QD solution 3 | 5.663 wt % red QDs (RND-028) in toluene |
| QD/Licocene in toluene | 4.4 wt % QD encapsulated in Licocene 4221 (10 wt % solids) by co-precipitation |

Formulation Sheet:

| | Film Formulation | | | | | | |
|---|---|---|---|---|---|---|---|
| | A | B (comp) | C | D (comp) | C | D (comp) | E (comp) |
| | | Green QDs Wt % | | | | Red QDs Wt % | |
| Component | | | | | | | |
| HEA/CN104 (2:1) | 76.55 | 90.45 | | | | | |
| HEA/CN104 (2:3) | | | | | 86.37 | 90.99 | 89.70 |
| SR833 | | | 76.55 | 90.69 | | | |
| I-819 | 1.326 | 1.573 | 1.326 | 1.577 | 1.500 | 1.583 | 1.326 |
| Finex 30S LP2 | 2.125 | 2.125 | 2.125 | 2.125 | 2.125 | 2.125 | 2.125 |
| Encapsulated QD 1 | 20 | | 20 | | | | |
| Encapsulated QD 2 | | | | | 10 | | |
| QDs solution 1 | | 5.88 | | | | | |
| QDs solution 2 | | | | 5.61 | | | |
| QDs solution 3 | | | | | | 5.30 | |
| QD/wax solution | | | | | | | 6.85 |
| Target resin OD/g | 3.0 | 3.0 | 3.0 | 3.0 | 3.0 | 3.0 | 3.0 |

QD Film Characterization

| Film | Thickness (μm) | Absorbance | G dots | R dots | PLQY * (%) | G_Peak | G_FWHM | R_PEAK | R_FWHM |
|---|---|---|---|---|---|---|---|---|---|
| A | 108 | 0.137 | 15-004 | NA | 57.9 | 536.1 | 43.1 | NA | NA |
| B (comp) | 101 | 0.130 | 15-004 | NA | 44.7 | 546.3 | 42.9 | NA | NA |
| C | 101 | 0.151 | 15-004 | NA | 46.9 | 535.8 | 43.8 | NA | NA |
| D (comp) | 138 | 0.249 | 15-004 | NA | 39.6 | 545.8 | 42.5 | NA | NA |
| E | 112 | 0.199 | N/A | RND-028 | 63.8 | NA | NA | 632.19 | 53.8 |
| F (comp) | 112 | 0.140 | N/A | RND-028 | 43.6 | NA | NA | 644.84 | 54.8 |
| G (comp) | 100 | 0.192 | N/A | RND-028 | 58.7 | NA | NA | 632.19 | 53.8 |

Based on these results, polymers 1 provides physical protection to QDs from polar monomers that form polymer 3 after curing, and thus the inventive examples show higher PLQY. By the co-precipitation method, some QDs may be present at the surface of the wax particles, while use of polymer 2 phase mitigates the undesired contact between QDs and polar monomers thus yielding better PLQY.

The invention claimed is:

1. A polymer composite comprising quantum dots; said polymer composite comprising: (a) quantum dots; (b) a first polymer having a molecular weight from 1,000 to 100,000 kg/mol, a solubility parameter from 12 to 17 MPa$^{1/2}$ at 25° C., wherein the first polymer is selected from the group consisting of maleic anhydride (MA)-olefin copolymers, acrylic-olefin copolymers, styrene-MA copolymers, and oxidized polyethylene, and wherein the first polymer encapsulates the quantum dots; (c) a second polymer comprising polymerized units of a first compound comprising at least one readily polymerizable vinyl group and having a molecular weight from 72 to 500 kg/mol selected from the group consisting of isobornyl (meth)acrylate, $C_2$-$C_{18}$alkyl(meth)acrylates, L-menthylacrylate, tricyclo[$5.2.1.0^{2,6}$]-decylmethyl acrylate, $C_1$-$C_6$ alkylstyrenes, and 3,3,5-trimethylcyclohexyl methacrylate, wherein the second polymer has a solubility parameter from 16.5 to 20 MPa$^{1/2}$ at 25° C., and wherein the second polymer surrounds the particles of encapsulated quantum dots; and (d) a third polymer comprising polymerized units of a second compound comprising at least two readily polymerizable vinyl groups and having a molecular weight from 72 to 2000 kg/mol selected from the group consisting of tricyclo [$5.2.1.0^{2,6}$] decane dimethanol di(meth)acrylate, Bisphenol A di(meth)acrylate, Bisphenol A glycerolate di(meth)acrylate, 2-butyl-2-ethyl-1,3-propanediol dimethacrylate, 1,10-bis(acryloyloxy)decane and

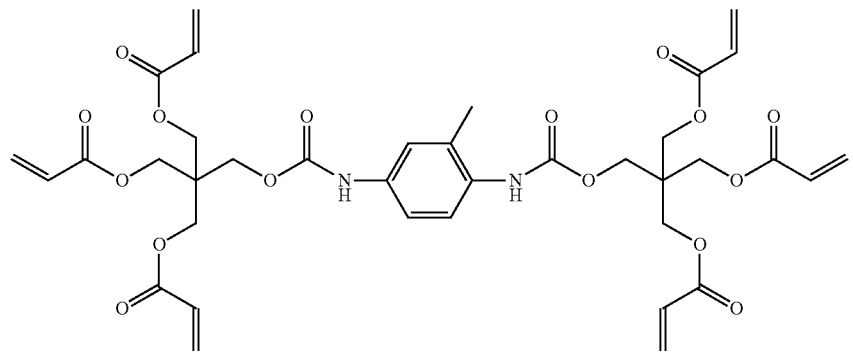

(A)

and urethane acrylate oligomers which can be polyester type, polyether type, polybutadiene type, or polycaprolactone type.

2. The polymer composite of claim 1 in which the solubility parameter of the second polymer minus the solubility parameter of the first polymer is at least 0.5 $MPa^{1/2}$ at 25° C.

3. The polymer composite of claim 1 comprising from 2 to 20 wt % of the first polymer, from 2 to 20 wt % of the second polymer, from 70 to 94 wt % of the third polymer and 0.05 to 2 wt % of quantum dots.

4. A method for producing the polymer composite; said method comprising steps of:
(a) precipitating encapsulated quantum dots from a mixture comprising quantum dots, a first polymer having a molecular weight from 1,000 to 100,000 kg/mol and a solubility parameter from 12 to 17 $MPa^{1/2}$ at 25° C. and a solvent;

(b) spray drying the solution and encapsulated quantum dots from step (a) together with a second polymer comprising polymerized units of a first compound comprising at least one readily polymerizable vinyl group and having a molecular weight from 72 to 500 kg/mol and a solubility parameter from 16.5 to 20 $MPa^{1/2}$ at 25° C. to produce an encapsulated quantum dot powder; and (c) dispersing the encapsulated quantum dot powder in a second compound comprising at least two readily polymerizable vinyl groups and having a molecular weight from 72 to 2000 kg/mol and curing to form a polymer composite; wherein a readily polymerizable vinyl group is part of a (meth)acrylate ester group or is attached directly to an aromatic ring.

* * * * *